United States Patent [19]
Simmons, Sr.

[11] 3,989,395
[45] Nov. 2, 1976

[54] HOLDER FOR ADJUSTABLE MAGNETIZED DOWEL PIN STOP

[76] Inventor: Roscoe H. Simmons, Sr., 1817 Larnard Drive, Des Moines, Iowa 50317

[22] Filed: Dec. 2, 1974

[21] Appl. No.: 528,919

[52] U.S. Cl. .................................. 403/110; 83/268; 403/14; 403/DIG. 8; 403/361; 403/365; 403/165
[51] Int. Cl.² ........................ F16D 1/12; F16D 3/00
[58] Field of Search.................. 403/14, 19, DIG. 1, 403/256, 263, 361, 164, 165, 365, 110; 52/758 F; 83/268, 391, 419, 467; 72/8, 36, 21, 389, 461

[56] References Cited
UNITED STATES PATENTS

| | | | |
|---|---|---|---|
| 2,213,919 | 9/1940 | Michon | 287/DIG. 8 |
| 2,615,738 | 10/1952 | Johnson | 403/DIG. 1 |
| 3,089,715 | 5/1963 | Fairgrieve | 403/19 |

Primary Examiner—Wayne L. Shedd
Attorney, Agent, or Firm—Zarley, McKee, Thomte & Voorhees

[57] ABSTRACT

A U-shaped holder includes free ends which may be adjustably drawn together by an adjustment bolt such that a bushing positioned in a cavity formed in the free ends is adjustably clamped. A magnetized dowel pin is eccentrically positioned in the bushing. A locater pin may be positioned in the lower end of the cavity and be urged downwardly by a spring between the dowel pin and the locater pin. The bushing is of non-ferrous material to shield the locater pin from the magnetic dowel pin.

6 Claims, 5 Drawing Figures

HOLDER FOR ADJUSTABLE MAGNETIZED DOWEL PIN STOP

BACKGROUND OF THE INVENTION

This invention relates to adjustable stops for stamping presses and press brakes wherein the adjustable stop is mounted either on a key-slotted plate or on a template.

Stops heretofore used require, for adjustment purposes, adjustment of the entire holder, rather than just the portion that engages the work piece, thus requiring considerable time and effort. The adjustable stop of this invention allows for the dowel pin, which is eccentrically positioned in the holder, to be adjusted through rotation thereof.

SUMMARY OF THE INVENTION

In accordance with the present invention, the holder is secured to a table having T-shaped slots to receive the head of a bolt extending through the holder. The upstanding magnetized dowel pin is eccentrically positioned in a bushing received in a cavity formed between the free ends of the U-shaped holder. A locater pin is urged downwardly and outwardly by a spring between the dowel pin and the locater pin. When the holder is used on the T-slotted plate, the locater pin is retracted. When the holder is used on a template, the locater pin is received in a locater hole in the template. Adjustment of the dowel pin is accomplished through operation of a wrench on the cooperating bushing shoulders.

DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings in which:

DESCRIPTION OF THE PREFERRED EMBODIMENT

Figure 1:
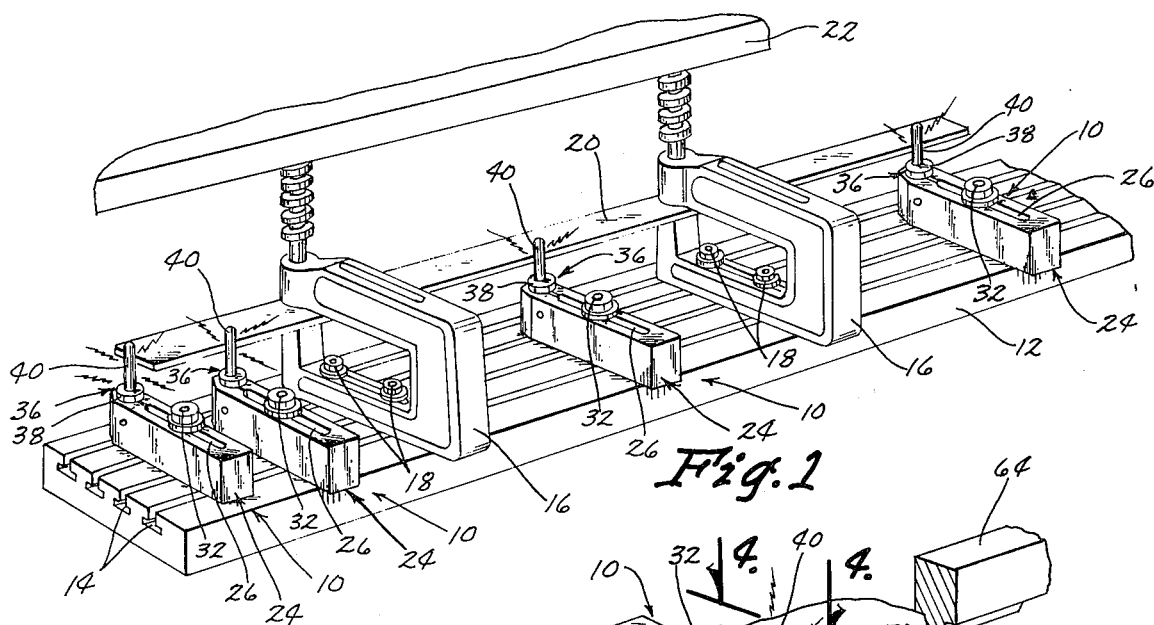
FIG. 1 is a perspective view of a plurality of dowel pin stops mounted adjacent a pair of punches on a T-slotted plate of a stamping press or press brake.

The adjustable dowel pin stop of this invention is referred to generally in FIG. 1 by the reference numeral 10 and is shown positioned on a table 12 having T-shaped slots 14. A punch 16 is also adjustably secured by bolts 18. A work piece 20 is positioned by (a pair of) dowel pin stops 10 and the punches 16. The upper half 22 of a press is positioned for operation on the work piece 20 of the punch 16.

Figure 2:
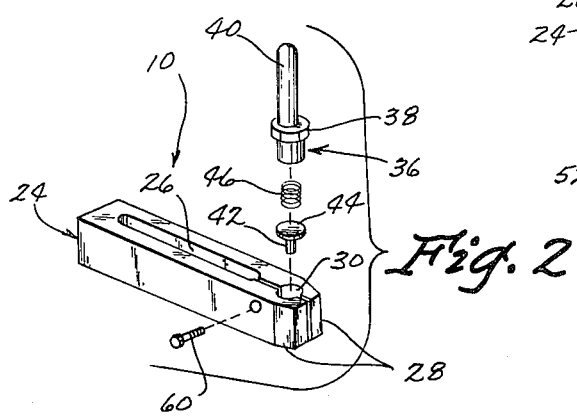
FIG. 2 is a perspective view of the adjustable magnetized dowel pin stop.

The adjustable dowel pin stop as seen in FIG. 2 includes a U-shaped holder 24 having an elongated slot 26 and free ends 28 shaped to form a cavity 30 therebetween. A hold-down bolt 32 extends in the slot 26 with its head (not shown) being received in the T-shaped slot 14 in the table 12. The dowel pin holder 24 may be adjustably positioned by moving the holder relative to the bolt 32 the distance of the slot 26, and the bolt may be moved in the slot 14.

Figure 4:
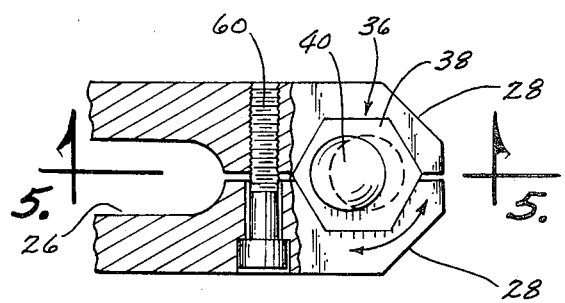
FIG. 4 is a cross-sectional view taken along line 4—4 in FIG. 3.
Figure 5:
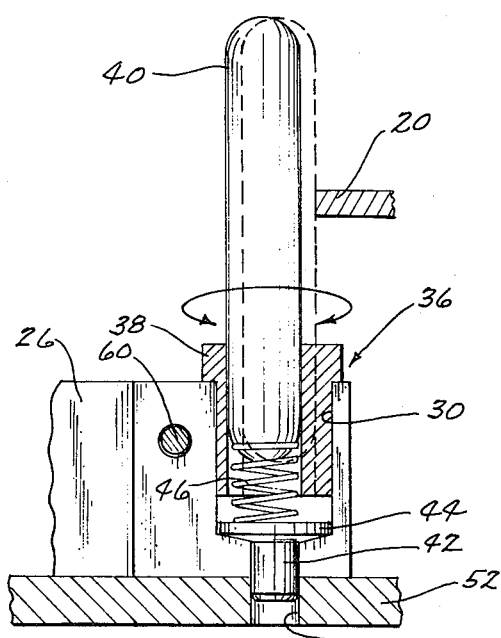
FIG. 5 is a cross-sectional view taken along line 5—5 in FIG. 4 and illustrates the adjustment capability of the dowel pin.

A bushing 36 having a nut-shaped shoulder 38 is positioned in the cavity 30 and includes a magnetized dowel pin 40 press fitted into the bushing. The dowel pin 40 is eccentrically located in the bushing 36 as best seen in FIGS. 4 and 5. The downward travel of the bushing 36 in the cavity 30 is limited by the engagement of the nut-shaped shoulder 38 with the upper face of the holder 24.

A locator pin 42 having an enlarged head 44 is positioned in the lower end of the cavity 30 and is urged downwardly by a spring 46 engaging at one end the lower end of the dowel pin 40 and at the other end the enlarged head 44 of the locator pin 42. The lower end of the locator pin 42 may move from a position totally retracted as in FIG. 1 or extending outwardly a short distance as seen in FIG. 5 wherein it is positioned in a locator hole 50 in a template 52.

To shield the locator pin 42 from the magnetized dowel pin 40, the bushing 36 is fabricated from nonferrous material such as aluminum or brass. The dowel pin 40 may be locked in any desired position as seen by the dash and solid lines in FIG. 5 by operation of the locking bolts 60 which serves to draw the free ends 28 of the holder 24 together, thereby clamping the bushing 36.

Figure 3:
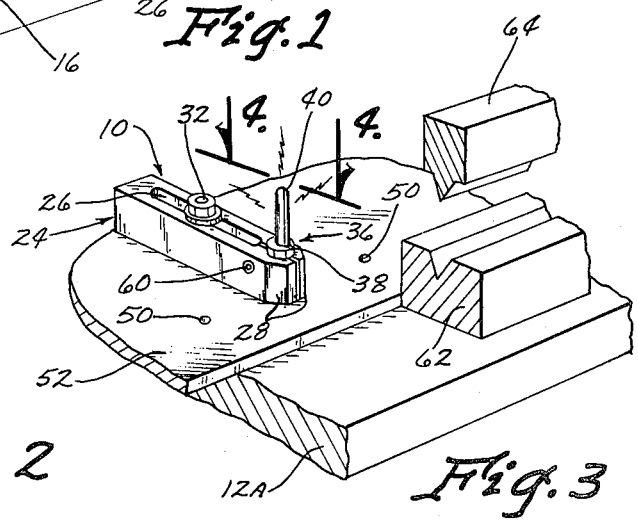
FIG. 3 is a perspective view of the dowel pin stop positioned on a template on a stamping press or press brake.

In FIG. 3 the template 52 is positioned on the press bed 12A, having a die 62 and a ram punch 64. While only one dowel pin stop 10 is shown, several will be utilized and positioned with the locator pins 42 in the locator holes 50 to position the work piece (not shown) to be worked upon by the ram punch 64.

It is seen in operation that the dowel pin stop 10 may be mounted either on the T-slotted bed 14 of FIG. 1 or the template 52 of FIGS. 3 and 5. On the T-slotted bed 14, the locator pin 42 is rendered inoperative by being displaced upwardly into the cavity 30, but on the template 52 the locator pin is received in the locator hole 50 to more accurately position the dowel pin stop. Minor or fine adjustments are now made by turning the bushing as seen in FIG. 5 to move the dowel pin 40 relative to the work piece 20. The bushing is made free by loosening the bolt 60, clamping the free ends 28 of the holder 24, and then the bushing is turned with a wrench, engaging the nut-shaped shoulders 38. When the desired position is reached, the bolt 60 is again tightened, thereby locking the bushing solid in the holder, and in turn, solidly positioning the magnetized dowel pin 40 for mechanically and magnetically engaging the work piece 20 to hold it in the desired position for being worked upon by the ram punch 64 of FIG. 3 or the punch 16 of FIG. 1.

What is claimed is:

1. An adjustable dowel pin stop comprising,
   a dowel pin holder having a cavity,
   a dowel pin eccentrically positioned in a bushing,
   said bushing rotatably positioned in said cavity,
   means on said bushing for selectively adjustably rotating said bushing and said dowel pin, and
   said holder including a spring-loaded locater pin on the bottom side thereof and said locater pin normally extending downwardly and outwardly to be received in a locater hole and being adjustable to be depressed upwardly and inwardly into said holder.

2. The structure of claim 1 wherein said dowel pin is formed from magnetic material.

3. The structure of claim 2 wherein said bushing is of non-ferrous material to shield said locater pin from being magnetized by said dowel pin.

4. The structure of claim 1 wherein said holder is U-shaped and bolt means is provided for adjustably moving the free ends of the legs of said U-shaped member towards and away from each other and said cavity is formed by said free ends of said legs whereby said bushing is adjustably clamped by said leg free ends.

5. The structure of claim 4 wherein a locater pin is positioned in said cavity below said dowel pin and a spring in said cavity urges said locater pin downwardly and outwardly of said holder.

6. The structure of claim 5 wherein one end of said spring engages the lower inner end of said dowel pin and the other end engages the inner upper end of said locater pin and an enclosed head is provided on said locater pin to limit outward travel in the cavity.

* * * * *